UNITED STATES PATENT OFFICE.

NELSON O. SELBY, OF MIDDLETOWN, OHIO.

COMPOSITION FOR SEALING PUNCTURES IN PNEUMATIC TIRES.

1,363,438. Specification of Letters Patent. Patented Dec. 28, 1920.

No Drawing. Application filed April 11, 1918. Serial No. 228,016.

*To all whom it may concern:*

Be it known that I, NELSON O. SELBY, a citizen of the United States, residing in the city of Middletown, in the county of Butler and State of Ohio, have invented a new and useful Composition for Sealing Punctures in Pneumatic Tires, of which the following is a specification.

My invention relates to a new and useful composition for sealing punctures in pneumatic tires.

The principal object of my invention is to provide a composition adapted to be introduced through the valve stem into a pneumatic tire, to automatically and effectively seal punctures therein.

My improved composition contains no ingredients that are deleterious to the rubber or other material of which the tire is formed; it is not sticky or gummy, and does not harden or cake. When the tire is not in motion, the compound remains in the bottom thereof; but when it is running the composition forms a soft coating which spreads over the entire inner surface of the inner tube.

When a nail or other element runs into the tire while the latter is in motion, the soft coating which the composition forms is pressed around the nail by the air that tries to escape, holding said nail air-tight; and when the latter is removed the air-pressure in the tire will at once force the soft coating into the hole left by the nail to effectively close it automatically.

My improved composition preferably comprises an admixture of the following ingredients. Ground wood, because of its fibrous qualities, is used as the holding agent of my compound. The fiber in the wood catches in the puncture hole, to receive and hold therein ground mica and talc or soapstone, two other ingredients of my composition. Water is the fourth ingredient employed, to which a sufficient quantity of alcohol is added in cold weather to prevent the composition from freezing.

The above ingredients are preferably employed in my composition in the following proportions, by volume. Ground or comminuted mica, 11¾%; ground wood, 11¾%; talc or soapstone, 6½%; and water, 70%.

In operation, the composition is injected into the tire through the valve stem, by an ordinary grease gun or small hose. As long as it is not in motion, the composition will remain in the bottom of the tire. The soapstone or talc acts as a lubricant to make the ground mica and wood fiber mobile, so that when the tire starts to revolve, the composition will spread in the form of a soft coating throughout the inner tube.

Now, when a nail or other element enters the tire, the fiber in the wood will immediately catch in the hole made thereby. The ground mica, being a coarser powder than the soapstone, will first be caught by the fiber, and then the soapstone, whereupon the soft coating formed will be pressed by the escaping air around the nail to effectively seal all openings through which further air might escape. When the nail is located and removed, the pressure of the air remaining in the tire will force the composition into the puncture hole, to automatically seal it. The fiber in the ground wood clings tenaciously to the edge of the hole to firmly hold the ground mica and soapstone in it in the form of a resilient plug that effectively closes it against the escape of air.

The ground mica and soapstone mix with, but are not dissolved by, the water. Accordingly, when the water evaporates, which often happens after the tire has been run four or five thousand miles, the composition returns to the same soft powder that it was before the water was added. It never cakes or becomes hard, nor sticky or gummy. The composition does not contain such ingredients as ammonia which have been found to attack rubber in much the same way as oil and acid. On the other hand, the ingredients which it does contain have no deleterious effect upon the rubber or other material of which the tire is formed.

Having described my invention, I claim:

1. A composition for sealing punctures in pneumatic tires, consisting of ground wood, comminuted mica, soapstone and water.

2. A composition for sealing punctures in pneumatic tires, consisting, by volume, of ground wood, eleven and three quarters parts; communited mica, eleven and three quarters parts; soapstone, six and one half parts; and water, seventy parts.

In testimony whereof I have hereunto set my hand this 9th day of April, 1918.

NELSON O. SELBY.

Witness:
HOWARD S. SMITH,